United States Patent [19]

Mausgrover et al.

[11] Patent Number: 5,427,693

[45] Date of Patent: Jun. 27, 1995

[54] MODULAR OZONE WATER TREATMENT APPARATUS AND ASSOCIATED METHOD

[75] Inventors: Robert H. Mausgrover; Dennis H. McEachern, both of Concord, N.C.

[73] Assignee: O-Three Limited, Concord, N.C.

[21] Appl. No.: 49,488

[22] Filed: Apr. 19, 1993

Related U.S. Application Data

[63] Continuation-in-part of Ser. No. 48,487, Apr. 16, 1993, which is a continuation-in-part of Ser. No. 832,989, Feb. 10, 1992.

[51] Int. Cl.$^6$ ................................................ C02F 1/78
[52] U.S. Cl. ...................... 210/739; 210/748; 210/759; 210/760; 210/96.1; 210/143; 210/192; 210/202; 210/220; 210/241; 422/186.3
[58] Field of Search ............... 210/760, 192, 739, 200, 210/201, 202, 241, 242.1, 242.2, 220, 221.2, 748, 759, 96.1, 143; 261/77; 422/24, 186.3

[56] References Cited

U.S. PATENT DOCUMENTS

| | | | |
|---|---|---|---|
| 565,952 | 8/1896 | Andreoli | 422/186.07 |
| 788,557 | 5/1905 | Sahlstrom | 422/186.07 |
| 832,768 | 10/1906 | Bridge | 422/186.14 |
| 935,457 | 9/1909 | Bridge | 422/186.07 |
| 1,437,760 | 12/1922 | Kuhlenschmidt | 422/186.07 |
| 1,808,956 | 6/1931 | Ketterer | 261/77 |
| 1,853,045 | 4/1932 | Gnau | 261/77 |
| 2,009,230 | 7/1935 | Hartmann | 210/760 |
| 2,658,868 | 11/1953 | Collison | 204/320 |
| 2,660,559 | 11/1953 | Prime | 210/760 |
| 3,023,155 | 3/1960 | Castor | 204/320 |
| 3,421,625 | 1/1969 | Fritz | 210/192 |
| 3,448,045 | 6/1969 | Hess et al. | 210/760 |
| 3,773,179 | 11/1973 | Hurst | 210/221 |
| 3,798,457 | 3/1974 | Lowther | 250/532 |
| 3,847,803 | 11/1974 | Fisk | 210/760 |
| 3,884,819 | 5/1975 | Schultz et al. | 250/533 |
| 3,891,561 | 6/1975 | Lowther | 250/541 |
| 3,899,682 | 8/1975 | Lowther | 250/531 |
| 3,899,684 | 8/1975 | Tenney | 250/535 |
| 3,920,552 | 11/1975 | Elkern | 210/241 |
| 4,019,983 | 4/1977 | Mandt | 210/760 |
| 4,035,657 | 7/1977 | Carlson | 250/533 |
| 4,053,403 | 10/1977 | Bachhofer et al. | 210/760 |
| 4,062,748 | 12/1977 | Imris | 204/176 |
| 4,090,960 | 5/1978 | Cooper | 210/192 |
| 4,128,477 | 12/1978 | Nebolsine | 210/709 |
| 4,138,724 | 2/1979 | Kawauchi | 210/760 |
| 4,159,971 | 7/1979 | Gneupel | 250/540 |

(List continued on next page.)

FOREIGN PATENT DOCUMENTS 224861 8/1910 France .
2606731 1/1978 Germany .

OTHER PUBLICATIONS

Brochure–RAYOX® Product Description, Solarchem Environmental Systems, Sep. 1990.

*Primary Examiner*—Cynthia L. Nessler
*Attorney, Agent, or Firm*—Bell, Seltzer, Park & Gibson

[57] ABSTRACT

An apparatus includes a frame carrying a process tank, ozone generating tubes, a venturi, and an infusion chamber for treating water with ozone. A pump circulates water from the process tank and through the venturi to the infusion chamber. The infusion chamber is connected immediately downstream from the venturi. The infusion chamber has a predetermined pressure to produce a head space and thereby generate a relatively large number of bubbles of relatively small size to enhance the mass transfer of ozone into the water. A length of tubing is connected downstream from the infusion chamber to enhance the contact time between the ozone and the contaminants. An ozone generator tube including an inner electrode formed of a mass of helical windings produces a high concentration of ozone from a cooled air supply.

33 Claims, 6 Drawing Sheets

U.S. PATENT DOCUMENTS

| | | | |
|---|---|---|---|
| 4,213,838 | 7/1980 | Lowther | 204/176 |
| 4,214,995 | 7/1980 | Saylor | 250/539 |
| 4,250,040 | 2/1981 | LaRaus | 210/760 |
| 4,256,574 | 3/1981 | Bhargava | 210/760 |
| 4,274,970 | 6/1981 | Beitzel | 210/192 |
| 4,351,734 | 9/1982 | Kauffman | 210/748 |
| 4,395,337 | 7/1983 | Ciepiela | 210/703 |
| 4,417,966 | 11/1983 | Krauss et al. | 422/186.19 |
| 4,599,166 | 7/1986 | Gesslauer | 210/192 |
| 4,614,573 | 9/1986 | Masuda | 204/176 |
| 4,619,763 | 10/1986 | O'Brien | 210/177 |
| 4,792,407 | 12/1988 | Zeff et al. | 210/760 |
| 4,793,931 | 12/1988 | Stevens et al. | 210/760 |
| 4,849,114 | 7/1989 | Zeff et al. | 210/747 |
| 4,909,996 | 3/1990 | Uys | 422/186.07 |
| 4,963,331 | 10/1990 | Mouw | 422/186.18 |
| 4,993,229 | 2/1991 | Baus et al. | 222/146.6 |
| 5,032,292 | 7/1991 | Conrad | 210/760 |
| 5,053,140 | 10/1991 | Hurst | 210/704 |
| 5,178,755 | 1/1993 | LaCrosse | 210/760 |
| 5,180,499 | 1/1993 | Hinson et al. | 210/760 |
| 5,211,919 | 5/1993 | Conrad | 422/186.07 |
| 5,213,773 | 5/1993 | Burris | 210/138 |
| 5,273,664 | 12/1993 | Schulz | 210/759 |

MODULAR OZONE WATER TREATMENT APPARATUS AND ASSOCIATED METHOD

RELATED APPLICATIONS

This application is a continuation-in-part application of U.S. patent application Ser. No. 08/048,487, filed on Apr. 16, 1993, which itself is a continuation-in-part application of U.S. patent application Ser. No. 07/832,989, filed on Feb. 10, 1992.

FIELD OF THE INVENTION

This invention relates to the field of ozone treatment, and more particularly, to an ozone treatment apparatus for treating contaminated water and an associated method.

BACKGROUND OF THE INVENTION

Ozone is one of the most powerful oxidizers and disinfectants available. Ozone not only kills bacteria, but also inactivates many viruses, cysts and spores. In addition, ozone oxidizes many organic chemical compounds, including chloramines, soaps, oils and other wastes thereby rendering them harmless to the environment. Accordingly, ozone may be used for a number of purposes, including: drinking water purification, waste water treatment, air purification and sterilization, and a variety of medical uses. U.S. Pat. No. 4,250,040 to LaRaus, for example, discloses an apparatus using ozone to purify septic water. Similarly, U.S. Pat. No. 4,256,574 to Bhargava discloses the combination of ozone with a pure oxygen stream to treat sludge, and wherein part of the ozonation off-gas is reused to supply the oxygen requirement of the biological treatment.

Although ozone is especially beneficial for breaking down certain contaminants in water, obtaining a sufficiently high concentration in water to be effective is difficult for two reasons. First, it is difficult to economically and reliably generate large amounts of ozone. Second, it is difficult to infuse ozone into contaminated water at a sufficiently high dosage to achieve the full potential of ozone as a powerful oxidant.

Ozone is typically generated by one of two methods. Ultraviolet lamps operating at a wavelength of between 180–190 nanometers may be used to produce ozone in ambient air. Ozone may also be generated by creating an electrical corona discharge between two energized electrodes in ambient air or in another oxygen containing gas. The electrodes are typically separated by a dielectric material, such as a glass, or an air gap separation may be provided. The corona discharge is an ionization of the air and is visually indicated by the presence of a pale violet or bluish color in the area between and surrounding the electrodes.

Because ozone has a half-life of only about 22 minutes in ambient air before dissociating back to oxygen, a process requiring ozone must desirably have an ozone generator in relative close proximity to the intended point of application of the ozone. Thus, an ideal ozone generator is desirably compact, relatively simple in construction, consumes little electricity, and produces little waste heat while producing a high concentration of ozone.

A number of ozone generators have been made or proposed based on the electrical corona discharge process for producing ozone. In particular, a wide assortment of electrode configurations have been developed to try to improve the performance of the basic corona discharge ozone generator. In addition, an increase in ozone production efficiency may be obtained by cooling and drying the intake air for a corona discharge generator as shown, for example, in U.S. Pat. No. 3,884,819 to Schultz et al. Unfortunately, despite the numerous beneficial applications for ozone, there still exists a need for an ozone generator that is relatively compact, rugged, reliable, readily manufactured, energy efficient, and which produces a high concentration of ozone.

To increase the amount of ozone that is generated, ozone generating tubes have been combined into modular units as shown, for example, in U.S. Pat. No. 4,035,657 to Carlson, and U.S. Pat. No. 3,798,457 to Lowther. In addition, U.S. Pat. No. 4,138,724 to Kawauchi discloses a control system for a plurality of ozone generators and includes a computer for adjustably controlling the power delivered to the ozone generators in response to a predetermined program or a user input of ozone demand.

In certain applications, ozone has been combined with other oxidants or treatment means to achieve enhanced results. For example, the combination of ozone with ultraviolet light and hydrogen peroxide has been proposed for treating water containing hydrocarbons and/or hydrazine and hydrazine derivatives as disclosed, for example, in U.S. Pat. No. 4,849,114 to Zeff et al. In particular, the patent discloses treating contaminated water with ozone, hydrogen peroxide, and ultraviolet light simultaneously, or, alternately, first with hydrogen peroxide and ultraviolet light, followed by the addition of ozone.

Thus, despite the numerous benefits available from using ozone to decontaminate water, its use still presents a number of technical challenges particularly in generating ozone efficiently and also in effectively transferring the ozone into the water. While large scale commercial ozone generating systems are available, such systems typically have a high capital cost, require continuing maintenance, are physically too large and cumbersome, and are too energy inefficient to be readily adapted to many smaller potential industrial and commercial applications.

SUMMARY OF THE INVENTION

It is therefore an object of the present invention to provide a modular apparatus and associated method for generating ozone efficiently and for effectively transferring the ozone into contaminated water to thereby treat the water with a high concentration of ozone.

These and other objects, features and advantages of the present invention are provided by a modular water treatment apparatus including a venturi connected to ozone generating means, an infusion chamber connected downstream from the venturi, and pump means for circulating water from a process tank through the venturi to the infusion chamber to produce a head space in the infusion chamber thereby producing a relatively large number of relatively small bubbles in the water to enhance the transfer of ozone into the water. The combination of the venturi and infusion chamber produces a high mass transfer ratio of ozone into the water visually indicated by a milky appearance of otherwise clear water. The term "contaminated water" is used herein to include water and any liquid to which ozone may be advantageously applied.

The water treatment apparatus also includes a frame and a process tank carried by the frame. The process tank is initially filled with the contaminated water to be treated. In addition, ozone generating means is carried by the frame for generating ozone gas. The venturi, infusion chamber, and pump which make up the ozone treatment means are also carried by the frame. The ozone treatment means is for transferring ozone into the water to be treated.

The infusion chamber preferably includes a generally vertically oriented tube having opposing closed ends, an inlet opening, and an outlet opening. The inlet opening is preferably in an upper portion of the tube and the outlet opening is in a lower portion. The tube also preferably has a predetermined cross-sectional area greater than a cross-sectional area of each of the inlet and outlet openings. In other words, the tube forming the infusion chamber is enlarged as compared to the plumbing connected to the chamber and, accordingly, the water velocity through a cross-section of the chamber is reduced from that in the adjacent plumbing. To enhance the performance, the inlet opening of the infusion chamber is also desirably located immediately downstream from the venturi.

Another aspect of the present invention is enhanced reaction of the ozone and contaminated water achieved by dwell reaction means which includes a predetermined length of tubing connected downstream from the infusion chamber. The tubing preferably has an inlet end connected to the infusion chamber and an outlet end positioned within the process tank. For compactness, the predetermined length of tubing is preferably arranged in a series of generally circular coils positioned within an interior of the process tank.

The ozonated water from the tubing is desirably discharged back into a lower portion of the process tank where continued breakdown of contaminants proceeds. Preferably nozzle means, including one or more nozzles, is connected to the outlet end of the tubing and maintains a predetermined back pressure in the tubing which, in turn, maintains the desired head space in the infusion chamber.

The ozone generating means for the apparatus preferably includes a generator tube housing carried by the frame. The housing preferably includes one or more corona discharge ozone generating tubes and means for cooling air within the housing to thereby provide a cool air supply for the corona discharge ozone generating tubes.

While other types of ozone generating tubes may be used, an ozone generating tube is desirably used of the type described in parent application Ser. No. 08/048,487 filed on Apr. 16, 1993 entitled *Ozone Generator Having a Conductor With Projections Extending Through an Inner Electrode and Associated Method*, and copending application Ser. No. 07/832,989, filed on Feb. 10, 1992 entitled *Ozone Generator Having an Electrode Formed of a Mass of Helical Windings*, and assigned to the assignee of the present invention, the entire disclosure of each application being incorporated herein by reference.

More particularly, the corona discharge ozone generating tube preferably includes a dielectric tube, an outer electrode surrounding the dielectric tube, and an inner electrode positioned in an interior portion of the dielectric tube underlying the outer electrode. The inner electrode preferably is formed of a mass of helical windings. Accordingly, the generating tube produces a high ozone concentration from an input of cooled air. In addition, the tube is rugged and compact.

To increase energy efficiency of the ozone generating means, a thermal insulation layer is preferably positioned adjacent interior surfaces of the housing. In addition, for enhanced reliability, the means for cooling the air in the housing is preferably provided by a thermoelectric cooler, of the type as would be readily understood by those skilled in the art.

The frame of the apparatus may also carry inlet filter means connected in fluid communication with the process tank for filtering an inlet flow of contaminated water into the process tank. Similarly, the frame may also carry outlet filter means connected in fluid communication with the process tank for filtering an outlet flow of treated water from the process tank.

Another significant aspect of the present invention is that sensor means is preferably coupled to water within the process tank for sensing an oxidation reduction potential (ORP) of the water in the process tank. The sensor is preferably a conventional ORP sensor as available from Extech, Waltham, Me. under the model designation 403066-R. The ORP sensor produces an output signal which is indicative of an ozone level in the water.

Accordingly, the apparatus also preferably includes control means, such as a microprocessor operating under stored program control, connected to the ozone generating means for controlling same responsive to the ORP sensor. The controller can thus control the ozone generating means to produce a predetermined level of ozone in the water of the process tank. In other words, the controller may control the ozone generating means, as well as the circulating pump, to stop the ozonation process once a predetermined level of ozone in the water of the process tank is achieved. As would be readily understood by those skilled in the art, the desired level of ozone in the water may vary depending on the specific application.

For treating certain types of contaminated water, ultraviolet treatment means may be mounted to the frame for exposing the contaminated water to ultraviolet light. Similarly, for certain types of contaminated water, a hydrogen peroxide dispenser, or treatment means, may be mounted to the frame and controlled by the microprocessor for adding hydrogen peroxide to the contaminated water as desired.

A method aspect of the present invention is directed to a method for treating contaminated water. The method includes the steps of: generating ozone gas; circulating a flow of contaminated water through a venturi while drawing generated ozone gas into the flow of water; and passing the ozonated water through an infusion chamber downstream from the venturi while maintaining a predetermined head space in the infusion chamber. As discussed above, the combination of the venturi and the infusion chamber thereby produces a relatively large number of relatively small bubbles in the water to enhance the transfer of ozone into the water.

The method also preferably includes the step of flowing the ozonated water through a predetermined length of tubing so that the ozonated water is contained within the tubing for a predetermined time to enhance reaction of ozone with contaminants in the water. The ozone is preferably generated by the corona discharge tube and thermoelectric cooler as described above.

The ozone generation is also preferably controlled responsive to sensing an oxidation reduction potential of the ozonated water indicative of an ozone level in the water. Thus, the ozone generation is controlled to thereby achieve a predetermined ozone level in the water dependent upon the particular type of contaminants in the water and the intended end use of the treated water. Further water treatment steps may include exposing the contaminated water to ultraviolet light, and/or treating the contaminated water with hydrogen peroxide.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, applicants provide these embodiments so that this disclosure will be thorough and complete, and will fully convey the scope of the invention to those skilled in the art.

Figure 1:
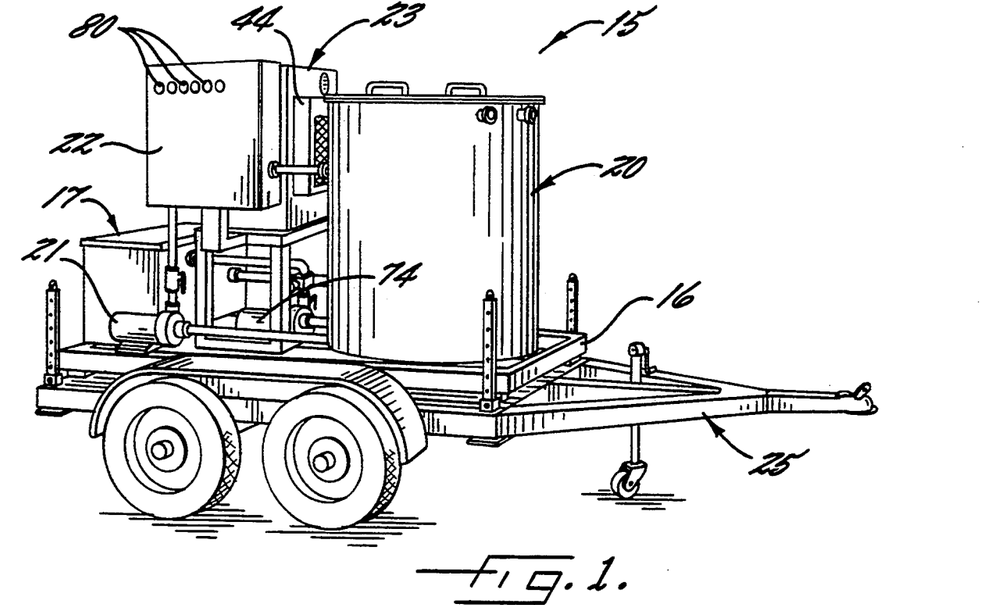
FIG. 1 is a perspective view of a first side of a modular ozone water treatment apparatus according to the present invention illustrating the apparatus mounted on a trailer, such as for transporting the apparatus or for a mobile application.
Figure 2:
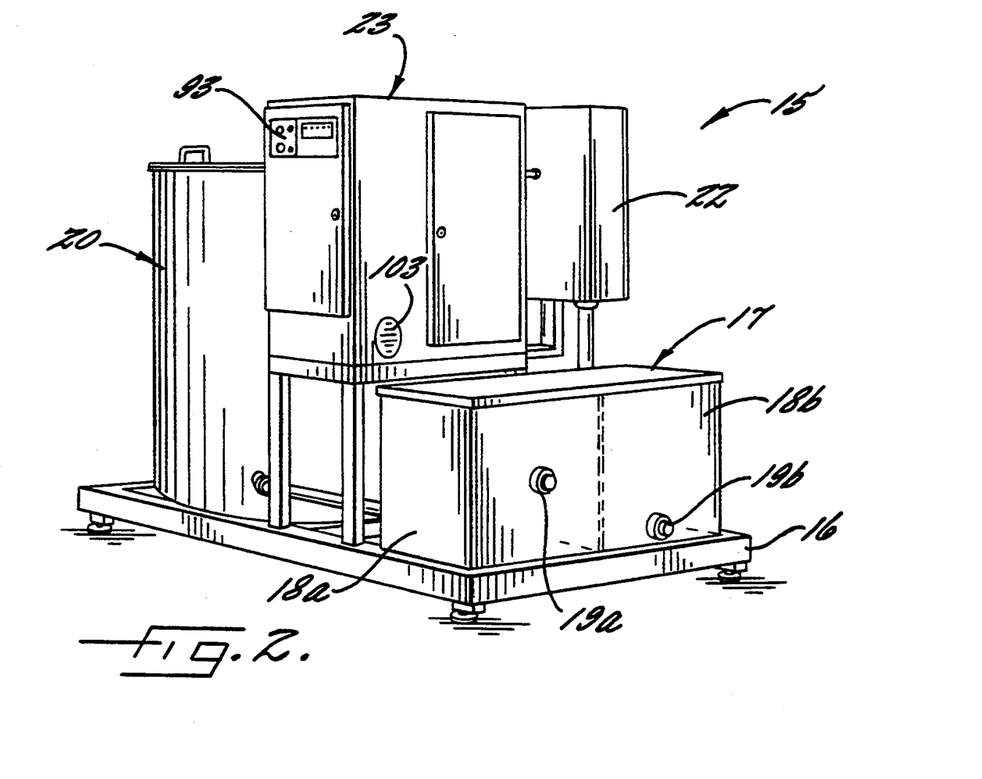
FIG. 2 is a perspective view of a second side of the modular ozone water treatment apparatus as shown in FIG. 1, but without the trailer to illustrate a typical fixed installation.

Referring first to FIGS. 1 and 2, the modular ozone water treatment apparatus 15 according to the invention is shown. The apparatus 15 includes a supporting frame 16 upon which is mounted a filter housing 17 which, in turn, includes an inlet filter section 18a and an outlet filter section 18b. The inlet and outlet filter sections include respective inlet and outlet couplings 19a, 19b permitting external connections to the apparatus.

A process tank 20 is also carried by the frame 16. The process tank 20 contains a predetermined quantity of initially contaminated water to be treated. A pump 21 (FIG. 1) recirculates water from the process tank 20 and through a venturi and infusion chamber contained within a first housing 22 as described in greater detail below. The venturi is fed ozone gas produced by a bank of ozone generating tubes contained within a second housing 23 on an opposite side of the apparatus from the first housing 22.

As shown in FIG. 1, the modular apparatus 15 is sufficiently compact to be mounted on a trailer 25 as illustrated, such as to facilitate transportation or mobile treatment applications. An example of a mobile treatment application is periodically processing the waste water accumulated at a gasoline tank farm. As shown in FIG. 2, the modular apparatus 15 may also be mounted on a floor, such as for an industrial application that requires continuous treatment of contaminated water.

As would be readily understood by those skilled in the art, the modular ozone treatment apparatus 15 according to the present invention may be used for treating all types of contaminated water. For example, the modular ozone treatment apparatus 15 may be used to purify water for drinking water supplies and for waste water treatment applications, such as sewage treatment and cleaning certain industrial effluents. As would also be readily understood by those skilled in the art, the ozone treatment apparatus 15 may be especially useful in treating hydrocarbon containing wastes, and for producing potable water. Many other applications of ozone to treat contaminated water will also readily come to the minds of those skilled in the art.

Figure 3:
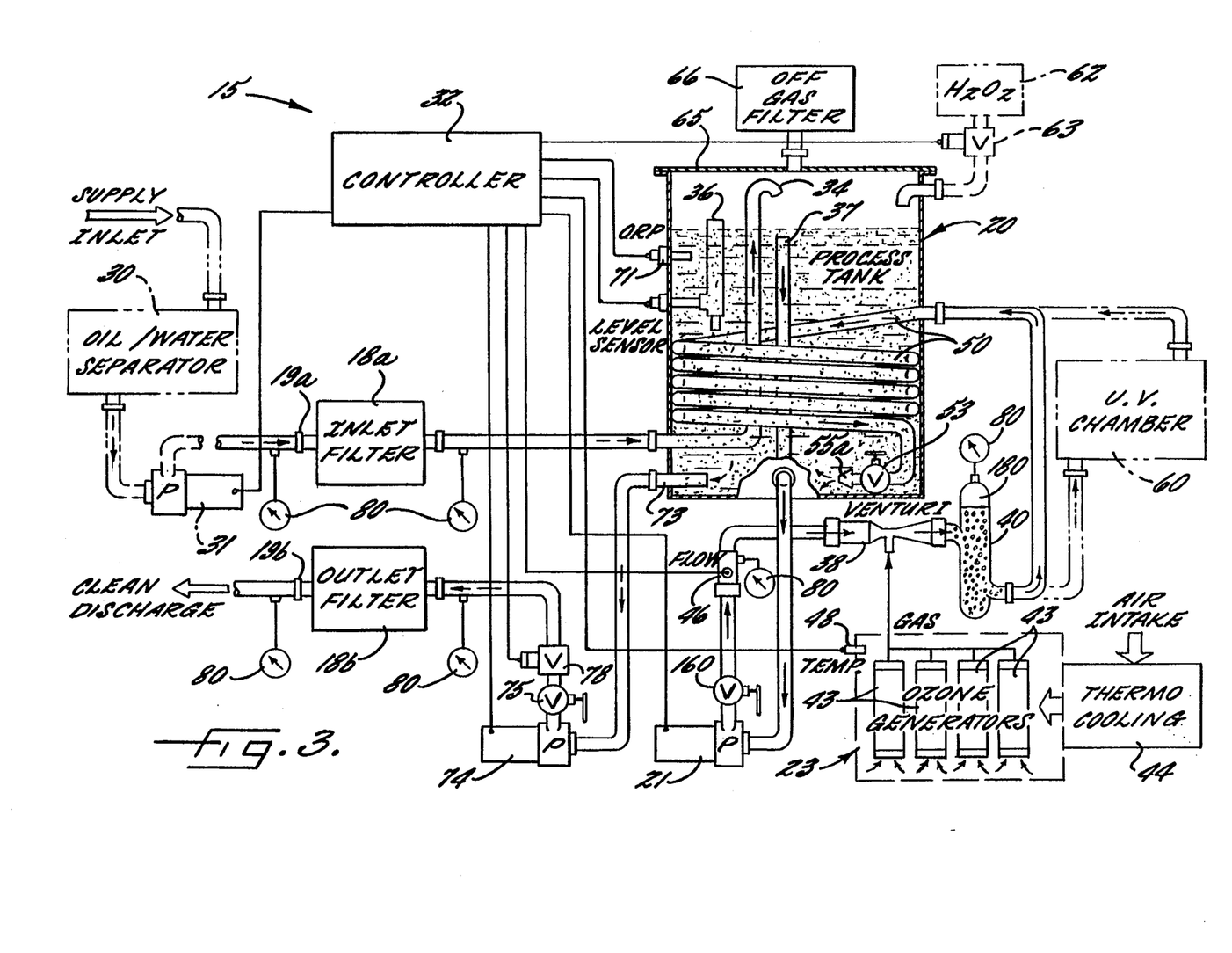
FIG. 3 is a schematic diagram of the ozone water treatment apparatus according to the present invention.

Referring now additionally to FIG. 3, the overall operation of the ozone water treatment apparatus 15 is best explained. Contaminated water is delivered to the inlet filter 18a from a supply. As would be readily understood by those skilled in the art, the inlet filter 18a may preferably be a relatively coarse filter to remove larger contaminants.

For contaminated water containing hydrocarbons, for example, an oil/water separator 30, such as a gravity oil/water separator, may be optionally be used. For a gasoline tank farm, for example, wash down water, tank condensate, and other contaminated water may be passed through the oil/water separator typically already at the tank farm and thereafter delivered to the modular apparatus 15 by a remote pump 31 operated by the apparatus controller 32.

As would be readily understood by those skilled in the art, the waste water from a tank farm typically includes a number of undesired hydrocarbons generally designated BTEX, which the ozone treatment apparatus 15 readily breaks down. As would also be readily understood by those skilled in the art, BTEX includes benzene, toluene, xylene, and ethyl benzene, each of which is a double bonded aromatic hydrocarbon that can be broken down by ozone.

From the inlet filter, the water is delivered to the process tank 20 via a fill pipe 34. The process tank 20 may be desirably made of stainless steel which is durable and is resistant to chemical attack from ozone. For typical applications, the process tank 20 may have a capacity of about 280 gallons and thereby hold 250 gallons of water with a head space thereabove.

Upon filling of the process tank 20 to a desired level, as sensed by a level sensor 36, the controller 32 may then operate the ozone treatment means to circulate water from the process tank 20 and infuse ozone into the water. As would be readily understood by those skilled in the art, the controller 32 is preferably a microprocessor operating under stored program control.

The ozone treatment means includes a pump 21 for circulating water from an intake pipe 37 in the process tank 20 through a venturi 38 to an infusion chamber 40 connected downstream from the venturi. As shown in the illustrated embodiment, the intake pipe 37 preferably draws the water from an upper portion of the process tank 20. In addition, an anti-swirling plate 39 (FIG. 11) is desirably positioned adjacent the opening of the intake pipe 37 to ensure a continuous flow of water into the pipe.

The venturi 38 has a gas inlet connected to ozone generating means provided by a plurality of corona discharge ozone generating tubes 43 as described in greater detail below. The air supply provided to the generating tubes 43 is preferably cooled to a temperature in the range of about 30°–40° F., by a thermoelectric cooler 44 connected to the generator housing 23, as also described in greater detail below.

As a safety feature, the controller 32 is connected to a flow proving switch 46 to ensure that the pump 21 is operating and water is flowing before activating the ozone generating tubes 43. In addition, a temperature sensor 48 is positioned within the generator housing 23 to ensure that cooled air is being delivered to the generating tubes 43.

Returning again to the venturi 38 and infusion chamber 40, the infusion chamber is desirably positioned within less than about 3 feet from the venturi, and, more preferably, is positioned immediately adjacent the venturi. The infusion chamber 40 cooperates with the venturi 38 to produce an extremely large number of very small ozone containing bubbles in the water. As would be readily understood by those skilled in the art, the smaller bubbles have a larger surface area for exposing the contaminants in the water to the ozone. In operation, the venturi 38 and infusion chamber 40 produce such a large number of small bubbles that the water in the process chamber appears milky.

Figures 11, 12:
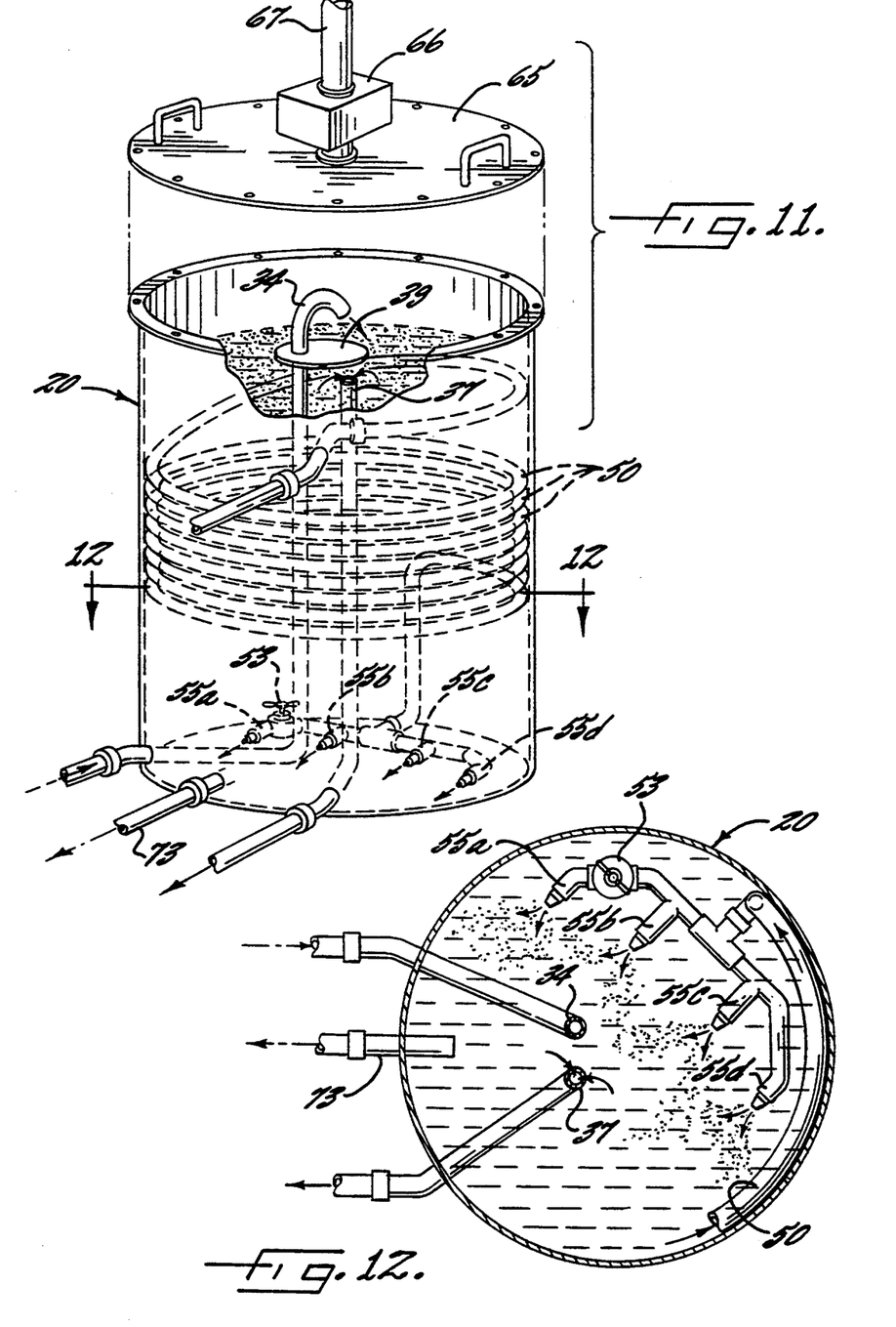
FIG. 11 is an exploded perspective view of the process tank according to the invention.
FIG. 12 is a cross-sectional view of the process tank taken along lines 12—12.

Referring now briefly additionally to FIGS. 11 and 12, another aspect of the present invention is discussed. The operation of the apparatus 15 is further enhanced by dwell reaction means provided in the illustrated embodiment by a predetermined length of tubing 50 connected downstream from the infusion chamber 40. The predetermined length of tubing 50 contains the flow of highly ozonated water for a predetermined time. For a typical application, the flow is about 30 gallons per minute, the tubing is about 1.5 to 2 inches in inside diameter, and the length is the range of about 50 to 200 feet, and more preferably about 100 feet. As shown in the illustrated embodiment, the tubing 50 is preferably positioned within the process tank 20 in a series of generally circular coils. The generally circular coils permit a relatively inexpensive flexible tubing to be used for the dwell reaction means.

Throughout the length of the tubing 50, the extremely large number of relatively small bubbles containing ozone interact with the contaminants in the water to break down the contaminants. An outlet end of the tubing 50 is connected to nozzle means provided by one or more nozzles 55a–55d positioned in the bottom of the process tank 20 in the illustrated embodiment. After the water is discharged into the process tank 20, the ozone continues to break down the contaminants, and the water is recirculated back through the venturi 38, the infusion chamber 40, and the predetermined length of tubing 50 providing the dwell reaction means, for another infusion of ozone.

To prevent ozone gas from escaping from the process tank 20, a cover 65 is provided, which in turn may include a conventional off-gas filter 66 for destroying the ozone and preventing its accumulation adjacent the apparatus 15. The filter 66 may be an activated charcoal type filter and is preferably vented to outside a building by a suitable flue pipe 67.

Returning now again to FIG. 3, it would be readily understood by those skilled in the art that additional treatment of the water may be required for certain types of contaminants. For example, to destroy certain types of viruses for drinking water, an ultraviolet treatment means is preferably used. The ultraviolet treatment means may be provided by a UV treatment chamber 60 containing one or more conventional UV lamps adjacent which the flow of water is directed. In addition, for certain applications it may be desirable to add hydrogen peroxide ($H_2O_2$) which, like ozone, is a powerful oxidant. Accordingly, $H_2O_2$ may be added to the water by a reservoir 62 containing an aqueous solution of $H_2O_2$ controllably dispensed by the controller 32 cooperating with a suitable solenoid valve 63.

The ozone level in the process tank water is preferably monitored for ozone level. In the illustrated embodiment, an oxidation reduction potential (ORP) sensor 71 is immersed in the process tank water and provides a signal to the controller 32. The ORP signal may be equated to a corresponding level of ozone by those of skill in the art. While conventional ozone level sensors are available, they are expensive and may prove unreliable in the field. Accordingly, the conventional ORP sensor 71 provides a lower cost and effective alternative to the ozone level sensor. The ORP sensor 71 may preferably be of the type available from Mazzei Injector Corporation of Bakersfield, Calif. under the model designation 1584A.

The ORP sensor 71 allows the controller 32 to shut down the ozone generating tubes 43 and recirculating pump 21 when the desired ozone level has been reached, thereby indicating the water has been effectively treated. In other words, since ozone is consumed when breaking down the contaminants, a predetermined relatively high level of ozone reached in the process tank water indicates that the treatment has been completed.

As would be readily understood by those skilled in the art, the controller 32 may preferably perform a number of functions including, among others: operating the thermoelectric cooler 44 to achieve a predetermined cool temperature before activating the generating tubes 43, determining when the proper ozone level is reached and shutting down the generating tubes 43, and continuing to run the recirculating pump 21 to draw any residual ozone from within the generating tubes and the housing 23 upon shut down of the generating tubes. The controller 32 may also provide local alarms and control relay output contacts, as well as interface to an external computer or monitoring device (not shown).

After the water has been treated by the apparatus 15, a discharge pump 74 may be activated by the controller 32 along with an associated solenoid valve 78 to pump the water through an outlet filter 18b for its intended end use. A hand operated valve 75 may also be provided for certain maintenance and other operations. As would be readily understood by those skilled in the art, the outlet filter 18b may be a relatively fine filter, such as an activated charcoal filter, to remove any remaining impurities from the water. As shown in the illustrated embodiment, pressure gauges 80 may be provided for the inlet and outlet filters, respectively, so as to determine when the filters might need servicing.

Figure 4:
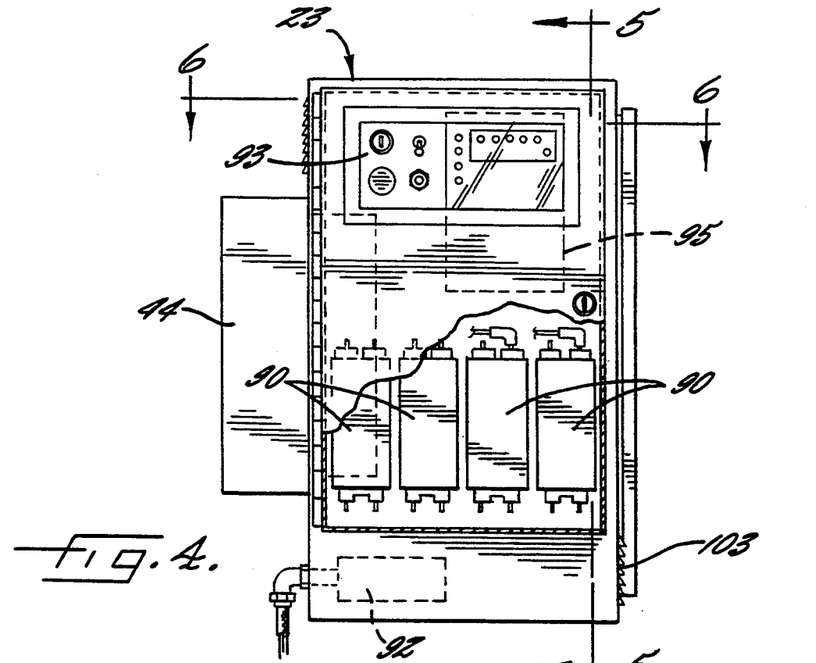
FIG. 4 is a fragmentary front view of the ozone generating housing according to the present invention.
Figure 5:
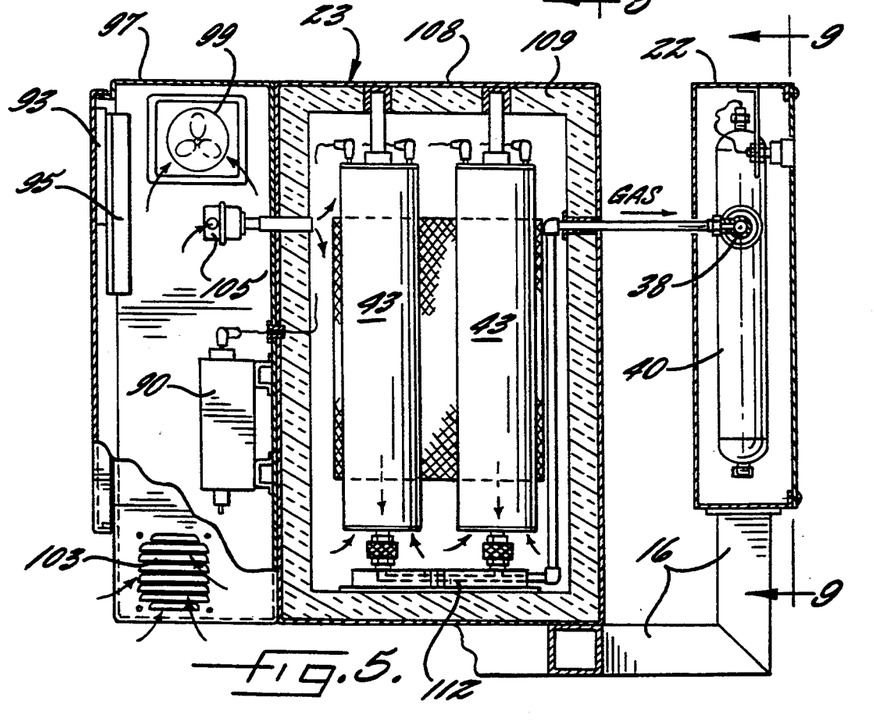
FIG. 5 is a cross-sectional view of the ozone generating housing taken along lines 5—5 of FIG. 4.
Figures 6, 7, 8:
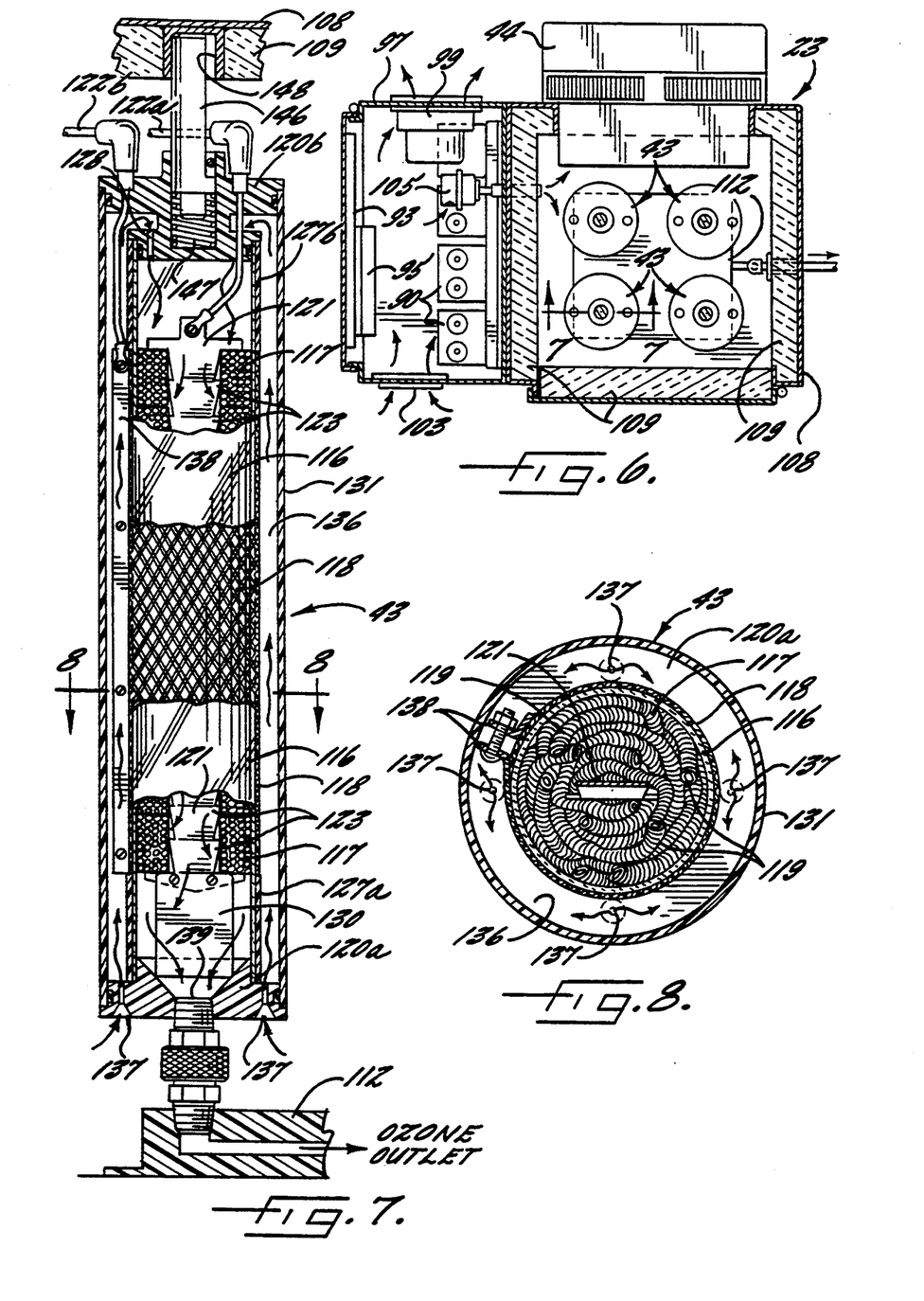
FIG. 6 is a cross-sectional view of the ozone generating housing taken along lines 6—6 of FIG. 4.
FIG. 7 is a fragmentary front view of a corona discharge ozone generating tube according to the invention.
FIG. 8 is a cross-sectional view of the ozone generating tube taken along lines 8—8 of FIG. 7.

Referring now to FIGS. 4-6, the ozone generating means according to the invention is explained. The ozone generating means includes a plurality of ozone generating tubes 43 which create a corona in the presence of an oxygen containing gas, such as air, to thereby produce ozone. In particular, a series of high voltage transformers 90 are connected on their primary side to commercially available power, such as 120 VAC, through appropriate fusing and switching (not shown) and a junction box 92. The transformers 90 may be of the type commonly used for neon lighting applications having an output voltage in the range of 9-15 KV as selected based upon the breakdown strength of the dielectric tube 116.

As shown in the illustrated embodiment, the housing 23 for the ozone generating tubes 43 includes a first section 97 containing the electrical components including a front display panel 93, a microprocessor board 95, a blower 99, and the transformers 90. An intake air louver 103 is also provided in the wall of the first housing section 97.

An air intake tube 105 communicates with the interior of a second housing section 108 to deliver air for conversion to ozone by the plurality of generating tubes 43. As shown in the illustrated embodiment, the second housing section 108 preferably includes a layer of thermal insulation 109 covering the interior surfaces thereof. A thermoelectric cooler 44 is connected to the second housing section 108 to cool the air and thereby increase the production efficiency of ozone. The ozone produced by the generating tubes 43 is collected by a manifold 112 at the bottom of the second housing section 108 and delivered by the venturi 38 to the infusion chamber 40 (FIG. 5).

Referring now to FIGS. 7 and 8, a preferred ozone generating tube 43 according to the invention is explained. The ozone generator 43 includes a first dielectric tube 116 that separates an inner electrode 117 and an outer electrode 118. The first dielectric tube 116 is preferably borosilicate glass, which is commonly available under the trademark PYREX ®. The borosilicate glass has a high dielectric strength and is resistant to pinholing damage caused by the strong electric fields created between the inner electrode 117 and the outer electrode 118 when the electrodes are powered.

The first dielectric tube 116 may typically have about a 3.4 inch diameter and have a length of about 20 inches. As would be readily understood by those skilled in the art, the dimensions of the ozone generating tube 43 according to the invention may be varied depending on the quantity of ozone production required. In the illustrated embodiment, the first dielectric tube 116 is shown as a cylinder having a circular cross-section; however, it would be readily understood to those having skill in the art that the tube 116 may have other cross-sectional shapes as well.

The inner electrode 117 is preferably provided by a mass of helical windings 119 positioned in the interior of the first dielectric tube 116 underlying the outer electrode 118. In the illustrated embodiment, the mass of helical windings 119 substantially fills the cross-sectional dimension of the first dielectric tube 116. The helical windings 119 in the mass thereof may be arranged in a somewhat regular arrangement, as illustrated, or the helical windings may be more randomly arranged, as long as the arrangement facilitates the intermixing of an oxygen containing gas passing through the helical windings of the inner electrode 117.

The helical windings 119 are preferably helically wound strips of electrically conductive material, such as stainless steel, which is resistant to chemical attack from ozone. The mass of helical windings 119 forming the inner electrode 117 may preferably be provided by one or more milled sponges of electrically conductive material. Each milled sponge has a plurality of layers of at least one continuous helical winding 119 extending in a generally spiral direction about a central axis of the milled sponge.

The radius of curvature of the helical windings 119 is preferably in the range of about one-sixteenth to one-eighth of an inch, and is preferably no more than about one-quarter of an inch. It is theorized without applicants wishing to be bound thereto, that the helical windings 119 of the inner electrode 117 with the series of curved surfaces thereon, have greater ionization efficiency than prior art electrodes because the electrical corona is also generated from a large number of points extending into the interior of the mass of helical windings 119, rather than being confined strictly to an outer surface portion as in typical prior art ozone generators.

The inner electrode 117 may preferably include an elongate conductor having a plurality of outwardly extending projections thereon. In the illustrated embodiment, the elongate conductor is an electrically conductive metal strip 121 extending lengthwise through the mass of helical windings 119 of the inner electrode. The metal strip 121 in the illustrated embodiment includes opposing rows of sawtooth projections 123 extending outwardly from opposing side edges of the metal strip. The metal strip 121 is preferably positioned along the axis of the dielectric tube 116 and in contact with adjacent portions of the mass of helical windings 119 of the milled sponges to thereby support the sponges within the dielectric tube 116, while also efficiently distributing electrical current along the full extent of the inner electrode 117.

The metal strip 121 also has a generally sinuous longitudinal cross-section defined by a series of spaced apart alternating bends, not shown, to further enhance electrical conductivity by providing more area over which power can be distributed within the mass of helical windings 119. The metal strip 121 is connected by a suitable high voltage insulated conductor 122a which, in turn, is connected to a respective transformer 90. The metal strip 121 may be secured within the dielectric tube 116 by an insulating spacer plate 130, as illustrated.

The outer electrode 118 is preferably an open lattice structure formed from an expanded metal sheet which is secured in a cylindrical shape with a clamp 138 surrounding the dielectric tube 116. The expanded metal structure prevents the formation of hot spots as would likely occur if a solid metal layer were used. The outer electrode 118 is also connected to a high voltage insulated conductor 122b which, in turn, is connected to a respective transformer 90.

The outer electrode 118 may preferably be stainless steel which is resistant to chemical attack from ozone. Also, the outer electrode 118 is held in place by a pair of spacer collars 127a, 127b at opposing ends of the dielectric tube 116. The spacer collars 127a, 127b may be sections of chlorinated polyvinyl chloride (PVC) tubing which is resistant to chemical attack from ozone.

In the illustrated embodiment, a second or outer tube 131 is preferably positioned in spaced apart relation from the first or inner dielectric tube 116 to thereby define a gas flow passageway 136 between the two tubes. Thus, the passageway 136 captures ozone generated at the outer electrode 118. Because of the high voltage carried by the outer electrode 118, the outer tube 131 is also preferably formed of a dielectric material.

End cap means for the generating tube 43 is preferably provided by respective lower and upper end caps 120a, 120b at the opposing respective lower and upper open ends of the tubes 116, 131. The end caps 120a, 120b facilitate the flow of gas into, within, and out of the ozone generating tube 43. The inflow of air is directed through inlet apertures 137 of the lower end cap 120a and into the passageway 136 between the first and second dielectric tubes 116, 131, as shown in FIG. 8.

The passageway 136 is in communication with the interior of the first dielectric tube 116 by way of intermediate apertures 128 in the upper end cap 120b. The ozone generated at the outer electrode 118 can thus be captured and combined with the ozone generate at the inner electrode 117. The ozone is directed out of the inner dielectric tube 116 through an outlet aperture 139. The outlet aperture 139, in turn, is connected in fluid communication with the manifold 112.

The ozone generating tube 43 also preferably includes plunger means carried by the upper end cap 120b so that the tube is readily installed or removed from the housing section 108. The plunger means preferably includes a keyed shaft 146 outwardly biased by a spring 147. The keyed shaft 146 includes an end portion extending into a corresponding recess 148 in the housing as in the illustrated embodiment. Thus, a generating tube 43 may be readily tested or replaced.

Figures 9, 10:
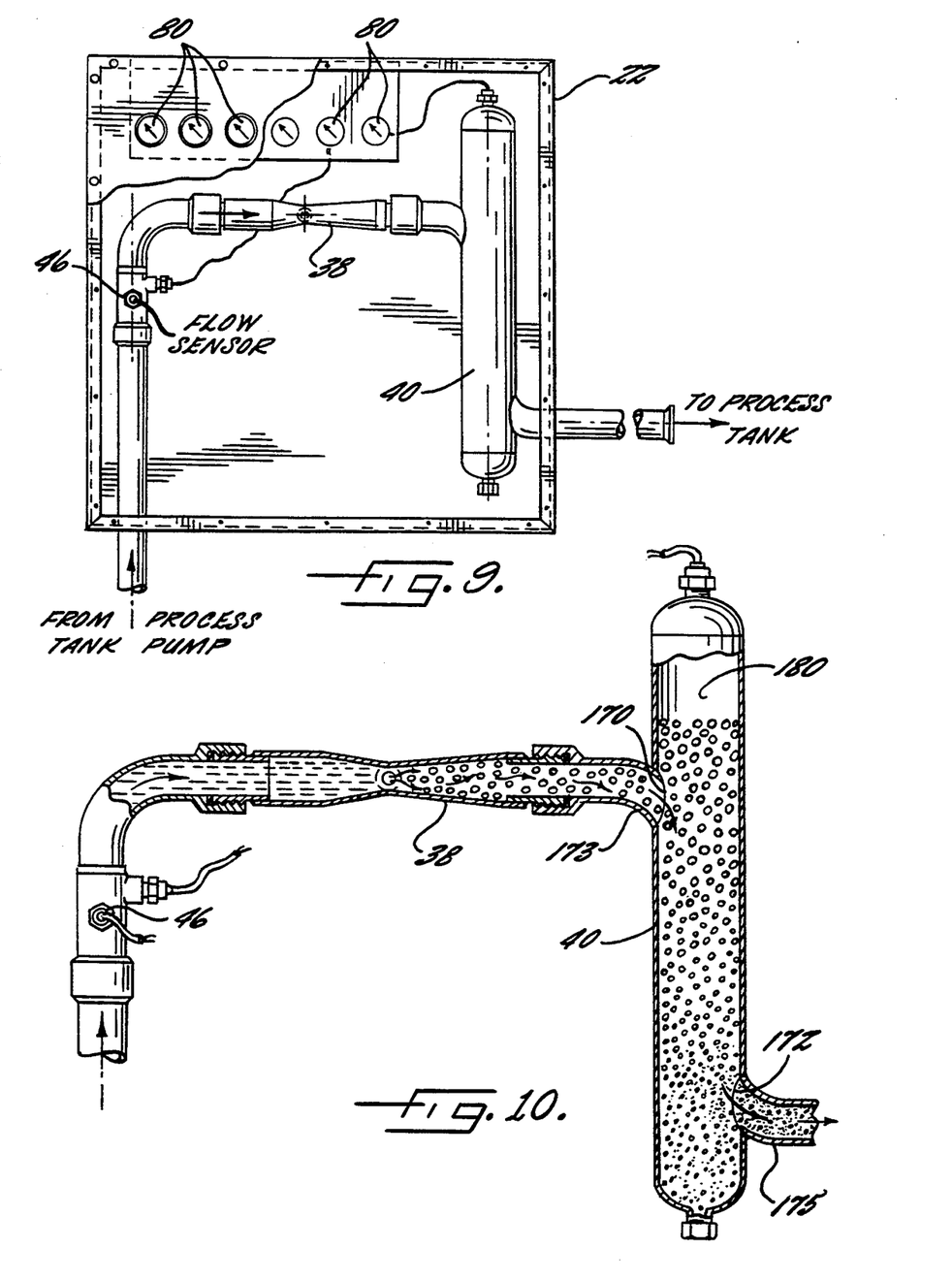
FIG. 9 is a fragmentary front view of the venturi and infusion chamber according to the present invention.
FIG. 10 is an enlarged fragmentary front view, partially in section, of the venturi and infusion chamber as shown in FIG. 9 schematically illustrating the bubbles in the infusion chamber.

Referring now to FIGS. 3, 9 and 10 the venturi 38 and infusion chamber 40 according to the invention are explained in greater detail. The water passing through the venturi 38 is subjected to a pressure drop as would be readily understood by those skilled in the art. It has been found that the pressure differential between the water inlet and outlet of the venturi 38 is desirably controlled to produce a predetermined pressure in the infusion chamber 40.

For example, for a flow rate of about 30 gallons per minute, and for a venturi model no. 1584A available from Mazzei Injector Corporation of Bakersfield, Calif., the high pressure on the upstream side of the venturi 38 is desirably about 40 psi, while the low pressure in the infusion chamber 40 is desirably about 25 psi. The venturi 38 may be a material such as KYNAR ® which is resistant to attack from ozone. The 15 psi pressure drop may be obtained by viewing the high and low side pressure gauges 80 and setting a hand valve 160 adjacent the pump 21, and a hand valve 53 adjacent one nozzle 55a at the end of the predetermined length of tubing 50 until the desired pressure drop is obtained. In other words, the hand valve 53 at the nozzle 55a, along with predetermined sized openings of the remaining nozzles 55b–55d, permit adjustment of a predetermined back pressure in the tubing 50.

Referring now more particularly to FIG. 10, the infusion chamber 40 preferably is formed of a tube having opposing closed ends as illustrated. The tube is mounted within the housing 22 in a generally vertical orientation. In addition, an inlet opening 170 is in an upper portion the tube, while an outlet opening 172 is in a lower portion of the tube. The inlet is fed by a swept pipe section 173, and the discharge from the outlet opening 172 is connected to a swept pipe section 175.

For the other parameters given above concerning flow rates and pressure drop, the infusion chamber preferably has about a 3 inch inside diameter and a length of about 19 inches. In addition, the inlet and outlet openings 170, 172, respectively, are approximately equally spaced from the top and bottom of the tube, and separated from each other by about 11 and $\frac{3}{8}$ inches. In addition, the inlet and outlet openings 170, 172, respectively, have a predetermined area less than the cross-sectional area of the tube. In other words, the velocity of the flow of water through a cross-section of the tube is less than through the adjacent interconnecting plumbing.

Applicants theorize, without wishing to be bound thereto, that the predetermined pressure in the infusion chamber 40 and the dimensions of the chamber produce a head space 180 in the upper portion of the infusion chamber 40 above the inlet opening 170 which contributes to the formation of a vast number of relatively small bubbles as illustrated schematically in FIG. 10. It has been found that the efficiency of the apparatus 15 is high enough that clear water turns milky white in appearance due to the presence of the great number of extremely small bubbles. Accordingly, the efficiency of mass transfer of ozone into the water is extremely high and a relatively high treatment, or processing, rate is achieved. Mass transfer rates of up to 90% have been achieved using the apparatus 15 according to the present invention.

Referring now primarily to FIG. 3, a method for treating contaminated water according to the present invention is explained. The method includes the steps of generating ozone gas, circulating a flow of contaminated water through a venturi 38 to draw generated ozone gas into the flow of water, and passing the ozonated water through an infusion chamber 40 downstream from the venturi 38. A predetermined head space 180 or head pressure is maintained in the infusion chamber thereby producing a relatively large number of relatively small bubbles in the water to enhance the transfer of ozone into the water.

The infusion chamber 40 includes a tube having an upper opening 170 and a lower opening 172, and the step of passing the ozonated water through the infusion chamber includes passing the water into the upper opening and out of the lower opening. The pressure in the infusion chamber is desirably maintained so that the head space is above the upper opening. The method also preferably includes the step of flowing the ozonated water through a predetermined length of tubing 50 downstream from the infusion chamber 40 so that the ozonated water is contained within the tubing for a predetermined time to enhance reaction of ozone with contaminants in the water.

The step of generating ozone gas preferably includes providing a housing 23 and at least one corona discharge ozone generating tube 43 within the housing, and cooling air within the housing to serve as a supply of cool air for the at least one corona discharge ozone generating tube 43. In addition, the step of cooling the air is preferably performed by cooling the air using a thermoelectric cooler 44.

Another feature of the method according to the invention is that sensing an oxidation reduction potential of the ozonated water indicative of an ozone level in the water may be used to control the generation of ozone responsive to the sensed oxidation reduction potential. Accordingly, a predetermined ozone level in the water may be achieved. For certain types of water to be treated, the method may also include the steps of treating the contaminated water with ultraviolet light and/or treating the contaminated water with hydrogen peroxide.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A modular apparatus for treating contaminated water, said apparatus comprising:
    a frame;
    a process tank carried by said frame for being initially filled with contaminated water to be treated;
    ozone generating means carried by said frame for generating ozone gas; and
    ozone treatment means carried by said frame and connected to said ozone generating means and in fluid communication with said process tank for transferring ozone gas into the water, said ozone treatment means comprising
    a venturi having a gas inlet connected to said ozone generating means,
    an infusion chamber connected in fluid communication with said venturi and downstream therefrom, said infusion chamber comprising a generally vertically oriented tube having an inlet opening, an outlet opening, and opposed closed ends, and
    pump means connected in fluid communication with said venturi, said infusion chamber, and said process tank for circulating water from said process tank and through said venturi and said infusion chamber to produce a closed head space above the inlet opening and within the closed upper end of said infusion chamber so that the inlet opening is below a level of water within said infusion chamber, and
    means connected downstream from said infusion chamber for producing a back pressure in said closed head space,
    said ozone treatment means producing a relatively large number of relatively small bubbles in the water to enhance transfer of ozone into the water.

2. An apparatus according to claim 1 wherein said ozone treatment means further comprises means for mounting said tube in a generally vertical orientation, and wherein said inlet opening is in an upper portion of said tube and said outlet opening is in a lower portion of said tube.

3. An apparatus according to claim 1 wherein said outlet opening is below said inlet opening.

4. An apparatus according to claim 1 wherein said tube has a cross-sectional area greater than a cross-sectional area of each of said inlet and outlet openings.

5. An apparatus according to claim 1 wherein an inlet opening of said tube is located immediately downstream from said venturi.

6. An apparatus according to claim 1 wherein said inlet opening of said tube is not greater than about 3 feet from said venturi.

7. An apparatus according to claim 1 further comprising inlet filter means carried by said frame and connected in fluid communication with said process tank for filtering an inlet flow of contaminated water into said process tank.

8. An apparatus according to claim 1 further comprising outlet filter means carried by said frame and connected in fluid communication with said process tank for filtering an outlet flow of treated water from said process tank.

9. An apparatus according to claim 1 further comprising:
    sensor means coupled to water within said process tank for sensing an oxidation reduction potential of the water in said process tank indicative of an ozone level in the water; and
    control means connected to said ozone generating means for controlling same responsive to said sensor means to produce a desired level of ozone in the water of said process tank.

10. An apparatus according to claim 1 further comprising ultraviolet treatment means carried by said frame for exposing the contaminated water to ultraviolet light.

11. An apparatus according to claim 1 further comprising hydrogen peroxide treatment means carried by said frame for adding hydrogen peroxide to the contaminated water.

12. An apparatus according to claim 1 wherein said ozone treatment means further comprises dwell reaction means connected in fluid communication with said infusion chamber and downstream therefrom for containing a flow of ozonated water for a time to enhance reaction of ozone with contaminants in the water.

13. An apparatus according to claim 12 wherein said dwell reaction means comprises a length of tubing having an inlet end connected to said infusion means and an outlet end positioned within said process tank.

14. An apparatus according to claim 13 wherein said length of tubing is in the range of about 50 to 200 feet.

15. An apparatus according to claim 13 wherein said length of tubing is arranged in a series of generally circular coils positioned within an interior of said process tank.

16. An apparatus according to claim 15 wherein said dwell reaction means further comprises nozzle means connected to the outlet end of said tubing for discharging water into said process tank while producing a back pressure in said tubing, said nozzle means defining said means for producing a back pressure.

17. An apparatus according to claim 1 wherein said ozone generating means comprises:
    a housing;
    at least one corona discharge ozone generator positioned within said housing; and
    means connected to said housing for cooling air within said housing to thereby provide a cool air supply for said at least one corona discharge ozone generator.

18. An apparatus according to claim 17 wherein said at least one corona discharge ozone generator comprises a dielectric tube, an outer electrode surrounding said dielectric tube, and an inner electrode positioned in an interior portion of said dielectric tube underlying said outer electrode, and wherein said inner electrode comprises a mass of helical windings.

19. An apparatus according to claim 17 further comprising a thermal insulation layer positioned adjacent interior surfaces of said housing.

20. An apparatus according to claim 17 wherein said means for cooling comprises a thermoelectric cooler.

21. An apparatus for transferring ozone into a flow of contaminated water, said apparatus comprising:
   a venturi having a gas inlet for being connected to a source of ozone gas;
   an infusion chamber connected in fluid communication with said venturi and downstream therefrom, said infusion chamber comprising a generally vertically oriented tube having an inlet opening, an outlet opening, and opposing closed ends, and
   pump means connected in fluid communication with said venturi and said infusion chamber for circulating contaminated water through said venturi and said infusion chamber to produce a closed head space above the inlet opening and within the closed upper end of said infusion chamber so that the inlet opening is below a level of water within said infusion chamber, and
   means connected downstream from said infusion chamber for producing a back pressure in said closed head space,
   said apparatus defining means for producing a relatively large number of relatively small bubbles in the water to enhance transfer of ozone into the water.

22. An apparatus according to claim 21 further comprising means for mounting said tube in a generally vertical orientation, and wherein said inlet opening is in an upper portion of said tube and said outlet opening is in a lower portion of said tube.

23. An apparatus according to claim 21 wherein said outlet opening is below said inlet opening.

24. An apparatus according to claim 21 wherein said tube has a cross-sectional area greater than a cross-sectional area of each of said inlet and outlet openings.

25. An apparatus according to claim 21 wherein an inlet opening of said tube is located immediately downstream from said venturi.

26. An apparatus according to claim 21 wherein said inlet opening of said tube is not greater than about 3 feet from said venturi.

27. A method for treating contaminated water comprising the steps of:
   generating ozone gas;
   circulating a flow of contaminated water through a venturi while drawing generated ozone gas into the flow of water; and
   passing the ozonated water through an infusion chamber comprising a generally vertically oriented tube having an inlet opening, an outlet opening, and opposed closed ends and being located downstream from the venturi while producing a back pressure and maintaining a closed head space above the inlet opening and within the closed upper end of the infusion chamber so that the inlet opening is below a level of water within the infusion chamber thereby producing a relatively large number of relatively small bubbles in the water to enhance transfer of ozone into the water.

28. A method according to claim 27 further comprising the step of flowing the ozonated water through a length of tubing downstream from the infusion chamber so that the ozonated water is contained within the tubing for a time to enhance reaction of ozone with contaminants in the water.

29. A method according to claim 27 further comprising the steps of sensing an oxidation reduction potential of the ozonated water indicative of an ozone level in the water, and controlling the generation of ozone responsive to the sensed oxidation reduction potential to thereby achieve a desired ozone level in the water.

30. A method according to claim 27 further comprising the step of additionally treating the contaminated water with ultraviolet light.

31. A method according to claim 27 further comprising the step of additionally treating the contaminated water with hydrogen peroxide.

32. A method according to claim 27 wherein the step of generating ozone gas comprises providing a housing and at least one corona discharge ozone generator within the housing, and cooling air within the housing to serve as a supply of cool air for the at least one corona discharge ozone generator.

33. A method according to claim 32 wherein the step of cooling the air within the housing comprises cooling the air with a thermoelectric cooler connected to the housing.

* * * * *